United States Patent

Max et al.

[11] 3,827,629
[45] Aug. 6, 1974

[54] DEVICE FOR ESTIMATING THE VALUE OF THE AMBIGUITY FUNCTION

[75] Inventors: Jacques Max, Saint-Egreve; Wlodzimierz Kofman, Ville Neuve, Grenoble, both of France

[73] Assignee: Commissariat A L'Energie Atomique, Paris, France

[22] Filed: Feb. 16, 1973

[21] Appl. No.: 332,802

[30] Foreign Application Priority Data
Feb. 24, 1972  France .............................. 72.06301

[52] U.S. Cl. ............ 235/150.53, 235/152, 235/156, 235/197, 324/77 B
[51] Int. Cl. ....................... G06f 15/34, G06g 7/19
[58] Field of Search ...... 235/181, 156, 164, 156.53; 324/77 R, 77 B, 77 E, 77 G

[56] References Cited
UNITED STATES PATENTS
3,404,261  10/1968  Jespers et al. ...................... 235/181
3,714,566  1/1973  Kang .................................. 324/77 E FOREIGN PATENTS OR APPLICATIONS
1,452,084  9/1966  France ................................ 235/181

OTHER PUBLICATIONS
Kindleman et al: High Speed Correlator. The Review of Scientific Instruments. Vol. 39, No. 6, pages 864-872.

*Primary Examiner*—Felix D. Gruber
*Attorney, Agent, or Firm*—Cameron, Kerkam, Sutton, Stowell & Stowell

[57] ABSTRACT

The value of the ambiguity function defined by:

$$A(r, f) = \int_{-\infty}^{\infty} X(t)Y(t-r)e^{-2\pi i t t} dt$$

is estimated by means of a method and a device designated as an "ambiguity meter" which are of primary interest in the field of signal analysis and processing.

The approximate value adopted for $A(r,f)$ is equal to:

$$\int_{-T}^{T} \operatorname{sgn} Z_1(t) \operatorname{sgn} Z_2(t-r) e^{-2\pi i t t} dt$$

where sgn $Z_1(t)$ is the sign of $X(t)+B_1(t)$ and sgn $Z_2(t)$ is the sign of $Y(t)+B_2(t)$; and $B_1(t)$ and $B_2(t)$ are two random signals produced by generators. The functions $X(t)$ and $Y(t)$ are applied to the two inputs of the ambiguity meter. The signs $Z_1$ and $Z_2$ are detected, then sampled by AND-gates. sgn $Z_2(t-r)$ is stored in a shift register and integration is performed in the stages of a Fourier transformation circuit.

2 Claims, 5 Drawing Figures

DEVICE FOR ESTIMATING THE VALUE OF THE AMBIGUITY FUNCTION

This invention relates to a method for estimating the ambiguity function and to a device for carrying out said method. The invention finds an application in the processing of signals.

It is known that, among the different methods which serve to study a signal representing a physical quantity, there are two main methods at present in use: the correlation methods and the Fourier transformation methods. If $X(t)$ and $Y(t)$ designate functions of the variable t which represent, for example, the time-dependent variations of a physical quantity, the autocorrelation function $C(r)$ is defined as follows:

$$C(r) = \lim_{T \to \infty} \frac{1}{2T} \int_{-T}^{T} X(t) X^*(t-r) dt \quad (1)$$

where $r$ is a time-delay and the cross-correlation function is defined by:

$$C'(r) = \lim_{T \to \infty} \frac{1}{2T} \int_{-T}^{T} X(t) \cdot Y^*(t-r) dt \quad (1')$$

Similarly, it is well known that the Fourier transform $F(f)$ of the function $X(t)$ is given by:

$$F(f) = \int_{-\infty}^{\infty} X(t) e^{-2\pi i f t} dt \quad (2)$$

where $f$ is a frequency and where $X(t)$ belongs to the class $L^2$ of summable square functions.

A number of patents have already been devoted to correlation and Fourier functions in regard to methods of computation as well as to devices for the application of these methods.

The present invention relates to a novel function which generalizes the two transforms (1), (1') and (2) in one respect, insofar as said function utilizes for processing the signal $X(t)$ a function $A(r, f)$ of the two variables r and f as thus defined:

$$A(r, f) = \int_{-\infty}^{\infty} X(t) \cdot Y^*(t-r) e^{-2\pi i f t} dt \quad (3)$$

A comparison with the transforms (1') and (2) immediately shows that the function $A(r, f)$ which will be discussed in this invention can be considered as a double correlation function in time and in frequency. It is in fact apparent that, if one uses $r = 0$ in (3), there is accordingly obtained a Fourier transform of the function $X(t) Y^*(t)$ and that if one puts $f = 0$, there is accordingly obtained the cross-correlation function defined by relation 1. This double correlation function which is designated as the ambiguity function by the present applicant virtually characterizes the resolving power of the signal in time and frequency displacement. The function aforesaid serves for practical purposes which are similar to those of the correlation or Fourier functions and in closely related fields of application.

The definition (3) of the ambiguity function presupposes a certain number of hypotheses and properties of a mathematical nature in regard to the functions $X(t)$ and $Y(t)$. Although the operations defined by (3) cannot be strictly performed on all the functions, it can nevertheless be shown that this ambiguity operator can be applied to practically all the functions which are representative of physical phenomena, in particular those whose representative functions are random, stationary, periodic or transient and which belong to the class $L^2$ of summable square functions.

Computation of said ambiguity function presents difficulties which are of two types: on the one hand, the functions $X(t)$ and $Y(t)$ are known in practice, not by their analytical representation but on the contrary by a physical representation so that the integration contained in the definition of A cannot be made by pure analytical means; furthermore, the integration time cannot conceivably be infinite in practice, with the result that the ambiguity function must be computed not with infinite integration limits but in respect of a finite time interval which will be assumed hereinafter to be equal to 2T. It can further be observed that the ambiguity function defined above is really of interest only insofar as it can be computed by practical means without entailing the need for devices of excessive complexity.

The precise aim of this invention is to provide a method for estimating this ambiguity function and a device for the practical application of this method, whereby said function can be calculated by simple means which call for the use of known techniques.

More precisely, the invention is directed to a method for estimating the value of the ambiguity function of two real functions $X(t)$ and $Y(t)$ of the time $t$ representing the variations of two given electrical signals within the time interval $[-T, +T]$, said ambiguity function being defined by:

$$A(r, f) = \int_{-\infty}^{\infty} X(t) Y(t-r) e^{-2\pi i f t} dt$$

where $r$ is a time-delay and $f$ is a frequency, characterized in that:

two random and independent electrical signals $B_1(t)$ and $B_2(t)$ are generated and uniformly distributed between the values $-A_1$ and $+A_1$ in the case of one signal, and $-A_2$ and $+A_2$ in the case of the other signal, $A_1$ and $A_2$ being higher than the maximum values assumed by $X(t)$ and $Y(t)$;

auxiliary signals $Z_1(t)$ and $Z_2(t)$ are formed by adding the signals $X(t)$ and $Y(t)$ respectively to the two random signals $B_1(t)$ and $B_2(t)$, the sign of the said auxiliary signals is detected, thereby generating two binary polarity signals having the notations sgn $Z_1(t)$ and sgn $Z_2(t)$, each polarity signal aforesaid is sampled at instant $p\theta$ which are uniformly spaced at an interval $\theta$, which provides N pairs of samples having the notations sgn $Z_1(p\theta)$ and sgn $Z_2(p\theta)$, where p is an integer which assumes N values between $-T/\theta$ and $+T/\theta$, all the samples of the sign of $Z_2$ which are prior to the sample sgn $Z_2(p\theta)$ are stored, namely sgn $Z_2(p\theta - q\theta)$, where q is an integer such that $0 \leq q \leq p$, each sample sgn $Z_2(p\theta - q\theta)$ is multiplied in the case of all values of q by the sample sgn $Z_1(p\theta)$, this being the case for all values of $p$, which gives product samples of the form $$\text{sgn } Z_2(p\theta - q\theta) \cdot \text{sgn } Z_1(p\theta),$$

the Fourier transform of said product samples considered as functions of the time $p\theta$ is formed in the case of each fixed value of $q$, which gives samples of the estimated ambiguity function, whether the known multiplication factor $A_1A_2/2T$ is taken into account or not.

In a preferential embodiment, in order to obtain said Fourier transform, samples having an amplitude $\cos \pi/T\, Kp\theta$ and/or $\sin \pi/T\, Kp\theta$ are formed in synchronism with the sampling of said polarity signals in respect to values of the integer K which increase from 1 inclusive to $2T/\theta$ inclusive, in the case of each value of $q$, the signal sgn $Z_1(p\theta)$ × sgn $Z_2(p\theta - q\theta)$ is multiplied by the signals $\cos \pi/T\, Kp\theta$ and/or by $\sin \pi/T\, Kp\theta$ having the same index $p$, this being the case with all the successive values of $p$, all the products having the same indices $q$ and $K$ are added in the case of the different values of $p$ and the sum thus obtained represents the sample of the ambiguity function in relation to the frequency $f = K/2T$ and to the time-delay $r = q\theta$.

The object of the present invention is also to provide a device for carrying out the method according to the invention, said device being characterized in that it comprises:

two inputs to which the electrical signals $X(t)$ and $Y(t)$ are applied respectively, two generators for producing independent random signals $B_1(t)$ and $B_2(t)$, a clock which emits pulses at the sampling frequency $1/\theta$, a first channel comprising: a mixer for receiving the signals $Y(t)$ and $B_2(t)$, a detector for detecting the sign of the output of the mixer and supplying a polarity signal applied to the input of an AND-type logical gate which also receives said clock pulses and delivers the samples sgn $Z_2(p\theta)$, a shift register having N cells and connected to said gate, a shift of said register being initiated by said clock pulses, a second channel comprising a mixer which receives the signals $X(t)$ and $B_1(t)$, a detector for detecting the sign of the output of the mixer and supplying a polarity signal applied to the input of an AND-type logical gate which receives said clock pulses and delivers the samples sgn $Z_1(p\theta)$, N exclusive-OR gates in parallel, one of the inputs of which is connected to said gate of the second channel and the other input of which is connected in the case of the gate having the order $q$ to the cell having the order $q$ of said shift register of the first channel;

means for forming in parallel the Fourier transform of the N signals which appear at the output of each of the N exclusive-OR gates.

In a preferential embodiment, said means for forming the Fourier transform comprise:

a sample generator having N outputs in parallel and numbered from $K = 1$ to $K = N$, the output having the order K being intended to deliver samples $\cos \pi/T\, Kp\theta$ or $\sin \pi/T\, Kp\theta$, said generator being controlled by said clock;

N identical stages, the order of one stage being given the notation $q$, each stage being constituted by N circuits, the order of one circuit being given the notation K, each circuit being provided with a multiplier whose output is connected to an integrator, the multipliers of the N circuit of any one stage having the order $q$ being all connected to the exclusive-OR gate having the order $q$, the N multipliers having the same order K and belonging to the N stages being all connected to the output having the order K of said sample generator, a multiplier of a circuit having the order K of the stage having the order $q$ being intended to deliver successively to the integrator, when $p$ varies from $-T/\theta$ to $+T/\theta$, products of the form $$[\text{sgn } Z_2(P\theta - q\theta) \cdot \text{sgn } Z_1(p\theta)] \cos \pi/T\, Kp\theta \text{ (and/or sine)},$$

the sum of said products being delivered at the output of said integrator and each final sum being intended to represent a sample of the ambiguity function in relation to the frequency $f = k/2T$ and to the time-delay $r = q\theta$.

The different characteristics and advantages of the invention will become more readily apparent from the following description which is given in the particular case in which the function $X(t)$ and $Y(t)$ are identical (which does not in any way affect the following explanations considered as a whole) and in which examples of execution are given solely by way of explanation without any limitation being implied. Reference is made in this description to the accompanying drawings, wherein.

The ambiguity function which was defined earlier by the relation (3) can naturally be calculated by the trapezoidal method, especially by computer. However, these methods are very long and tedious. On the contrary, the invention proposes a faster method of computation which consists in adopting the following expression as an approximate value of the function:

$$\frac{A_1 A_2}{2T} \int_{-T}^{T} \text{sgn } Z_1(t) \cdot \text{sgn } Z_2(t-r) e^{-2\pi i f t} dt \qquad (4)$$

It can in fact be demonstrated that the error which is made by adopting the expression (4) as the value of the ambiguity function is acceptable if the function $X(t)$ is resolved into a sufficiently large number of samples. More precisely, the error which is made in this estimation is proportional to $1/n$ if $n$ is the number of samples of the function $X(t)$.

Figure 1:
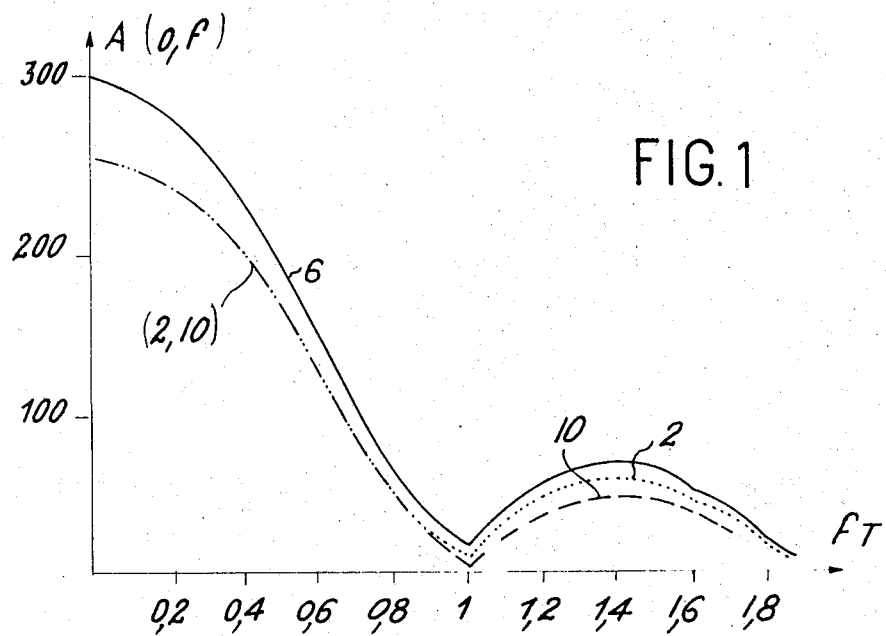
FIGS. 1 and 2 represent respectively the approximate values of $A(o,f)$ and $A(10,f)$ in the case of a particular function $X(t)$ when this function is sampled at $n = 500$ or $n = 1,000$ points, these approximate values being compared with exact values.
Figure 2:
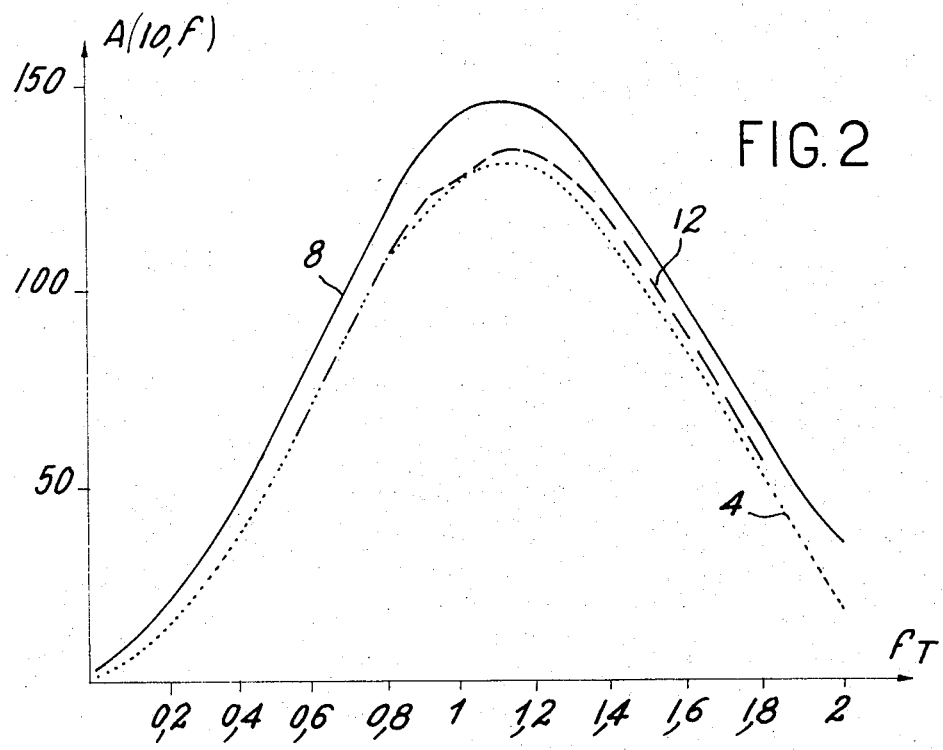

In order to illustrate the results obtained by this method of estimation, there are shown in FIGS. 1 and 2 two cross-sections of the ambiguity function in two planes parallel to the axis of frequencies and in respect of the values 0 and 10 of the time-delay variable $r$ in the particular case of a frequency-modulation signal $X(t)$ = $\cos K \pi t^2$, the duration of which is $T = 500$ ms. The ambiguity function has first been computed by the trapezoidal method in the case of 500 samples (curve 2 of FIG. 1 and curve 4 of FIG. 2). The ambiguity function has then been computed by the method explained in the foregoing. The curves 6 and 8 are obtained respectively in the case of $n = 500$ samples and the curves 10 and 12 are obtained in the case of $n = 1,000$ samples. These curves show the improvement in the approximation when the number of samples increases from 500 to 1,000; in particular, in the case of 1,000 samples, the function as thus computed is extremely close to the exact value as computed by a method which is much more time-consuming and laborious.

The method in accordance with the invention for the estimation of the ambiguity function as defined in particular by relation (4) lends itself to the construction of a simple device which will now be described hereunder.

Figure 3:
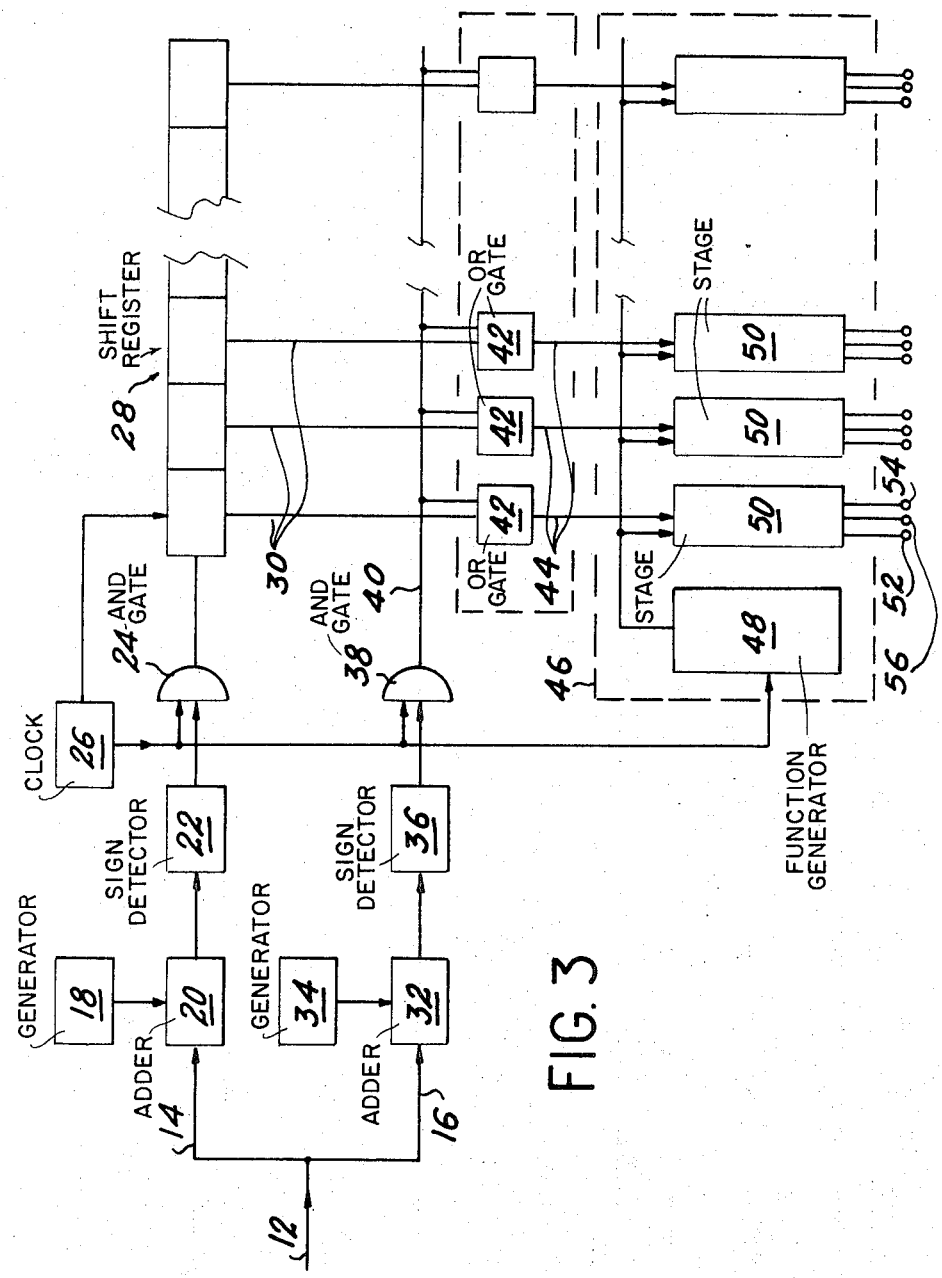
FIG. 3 shows a diagram of the device for the practical application of the invention.

FIG. 3 can be considered as the block diagram of a device in accordance with the invention for computing the approximate value of the ambiguity function or, if this is preferred, as the schematic diagram of an ambiguity meter. This circuit comprises the following elements:

the input 12 of the ambiguity meter to which the analog signal $X(t)$ is applied; this input is divided into two branches 14 and 16; the generator 18 produces a random signal $B_2(t)$; the adder 20 forms the sum of the signals $X(t)$ and $B_2(t)$; the polarity of the sum signal is detected by the sign detector 22 which transmits the polarity to a logical gate 24 of the AND type which is controlled by the pulses emitted by a clock 26; the clock 26 and the gate 24 sample the polarity signal and these samples are fed into a shift register 28; the signals contained in the N cells of the register appear on N leads which are designated by the reference 30. Shifting within the register is initiated by the pulses of the clock 26.

Similarly, the signal $X(t)$ is directed to a second adder 32 which also receives a random signal $B_1(t)$ emitted by the generator 34; the sum $X(t) + B_1(t)$ is formed in the adder 32 and the polarity of the sum signal is detected by the sign detector 36; the polarity signal is applied to a second logical gate 38 of the AND type which is controlled by the pulses of the clock 26; the samples of the polarity signals are transmitted on the lead 40.

Figure 4:
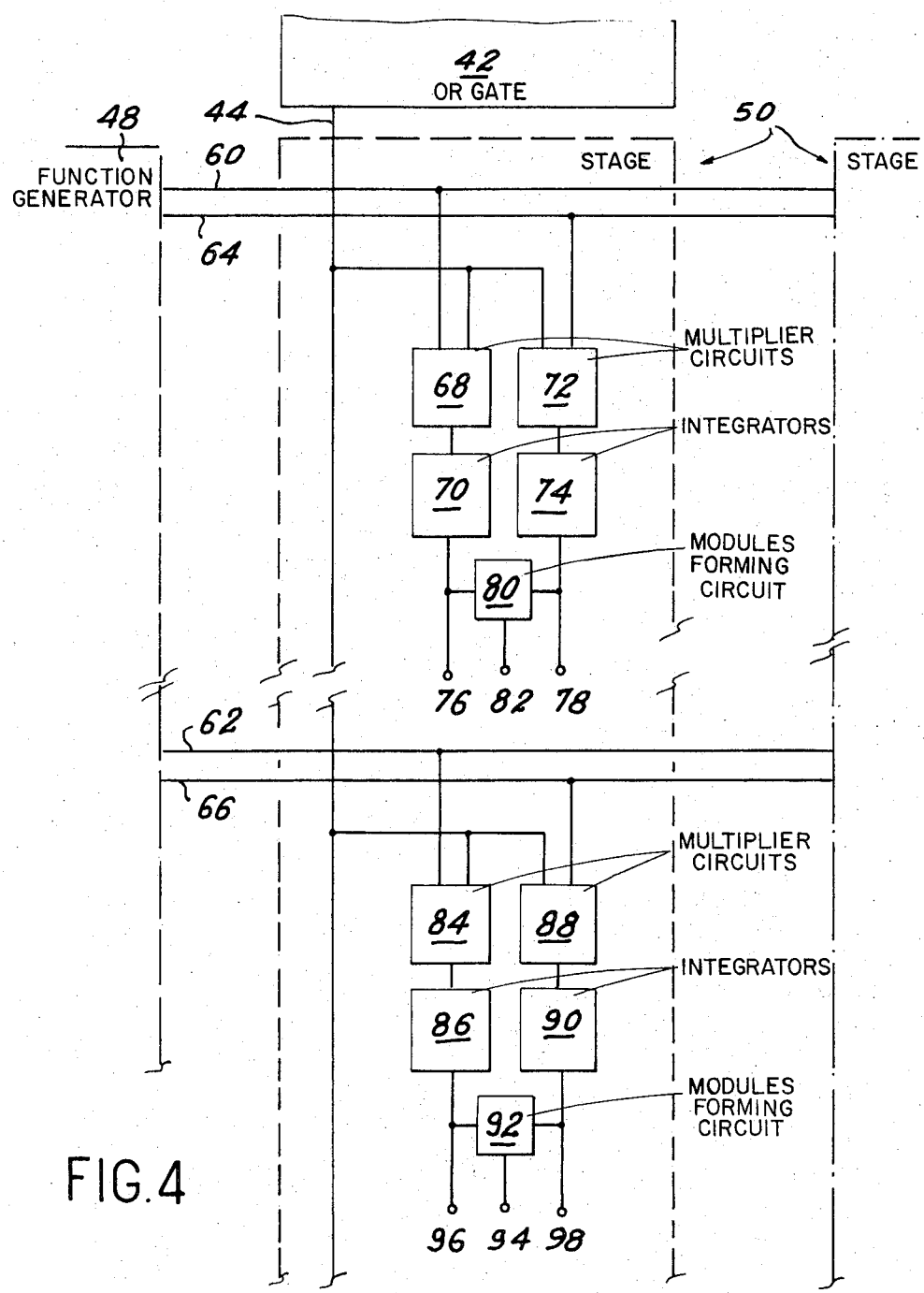
FIG. 4 shows a general arrangement diagram of a stage which serves to perform the Fourier transformation of signals derived from the exclusive-OR gates of the diagram of FIG. 3.

There are applied to the input terminals of the N exclusive-OR gates 42 on the one hand the signals which are contained in the N cells of the shift register 28 and on the other hand the samples which are derived from the gate 38; the output leads 44 of the N gates terminate in a circuit 46 containing means for performing the Fourier transformation of the signals which appear on the different leads 44; in particular, the circuit 46 comprises a function generating unit 48 and N identical stages 50, the characteristics of which will be given in connection with the description of FIG. 4; each stage 50 has a plurality of output leads 52 which give the real portions of the ambiguity function, a plurality of output leads 54 which give the imaginary values of the function and a plurality of output leads 56 which give the values of its modulus.

The operation of said device is as follows: the signal whose ambiguity function is to be computed is fed to the device via the input terminal 12; the generators 18 and 34 porduce random electrical signals $B_2(t)$ and $B_1(t)$ respectively, the properties of which have already been defined in connection with the foregoing explanation of the method according to the invention and are as follows: $B_1(t)$ and $B_2(t)$ are random signals uniformly distributed between values $[-A_1, +A_1]$ and $[-A_2, +A_2]$, which are independent of each other and independent of the signal $X(t)$. The signals $Z_2(t)$ and $Z_1(t)$ are present respectively at the outputs of the adders 20 and 32 and the polarities of said signals are detected by the sign detectors 22 and 36. Said polarities which are designated respectively as sgn $Z_2$ and sgn $Z_1$ are sampled by means of the clock 26 through the intermediary of the logical gates 24 and 38 so that a signal sgn $Z_2(p\theta)$ is present at the output of the gate 24 and a signal sgn $Z_1(p\theta)$ is present at the output of the gate 38, $p$ being comprised between $-T/\theta$ and $+T/\theta$ if $\theta$ represents the sampling interval.

The shift register 28 receives the samples of the polarity signals sgn $Z_2(p\theta)$ so that, at the instant $t = p\theta$, sgn $Z_2(p\theta)$ is present within the first cell, sgn $Z_2(p\theta - \theta)$ is present within the second cell, sgn $Z_2(p\theta - 2\theta)$ is present within the third cell, and sgn $Z_2(p\theta - q\theta)$ is present within to cell of the order $q + 1$.

The signal sgn $Z_1(p\theta)$ is present on the lead 40 at each instant $t = p\theta$ of the sampling operation. The logical gates 42 perform the multiplication of the polarity signals since they are of the exclusive-OR type, with the result that the following products appear on the N leads 44:

$$sgn\ Z_2(p\theta - q\theta) \times sgn\ Z_1(p\theta)$$

In accordance with the estimation formula which is essential to the invention (formula 4) and whether the multiplication factor $A_1A_2/2T$ is taken into account or not, the Fourier transformation on the variable $p$ of said product gives the corresponding value of the ambiguity function, which is performed within the unit 46. To this end, said unit comprises a generator 48 for the functions $\cos 2\pi ft$ and/or $\sin 2\pi ft$; said functions are multiplied in the stages 50 by the value of the samples which appear on the leads 44, the result being subsequently integrated from $-T$ to $T$ as is known in devices for forming the Fourier transform of a signal.

If the function generator 48 generates R functions of the form $\cos 2\pi ft$ and/or $\sin 2\pi ft$ in which the frequency $f$ varies in an arithmetical progression and assumes R values, each stage 50 to which is assigned a value $q\theta$ of the time-delay relay $r$ will comprise 3R outputs which provide the R values of the real portion of the ambiguity function, the R values of its imaginary portion and the R values of the corresponding modulus; the ambiguity function is then known in the case of RN samples.

FIG. 4 is a diagram showing the stages 50 of FIG. 3 which serve to carry out the final step involved in the computation of the ambiguity function in accordance with the invention. In this figure, there is again shown one of the units 50, the exclusive-OR circuit 42 and its output lead 44, and the function generator 48 of FIG. 3. This generator unit has a double plurality of output leads on which appear either functions $\cos 2\pi$ ft or functions $\sin 2\pi$ ft in which $f$ can assume a number of discrete values In the case of one of these frequencies, namely the frequency $f_i$, the signal in $\cos 2\pi f_i t$ appears on the lead 60 and the signal in $\sin 2\pi f_i t$ appears on the lead 64; in the case of another frequency $f_j$ the signal in cos $2\pi f_j t$ appears on the lead 62 and the signal in sin $2\pi f_j t$ appears on the lead 66. The signal in cos $2\pi f_j t$ is multiplied by the signals which appear on the lead 44 within a multiplier circuit 68; an integrator 70 in connected to the output of the multiplier 68. Similarly, the chain for processing signals in sin $2\pi f_j t$ which appear on the lead 64 comprises a multiplier 72, the signal carried by the lead 44 being applied to one of the inputs of said multiplier and the sinusoidal signal emitted by the generator 48 being applied to the other input; a second integrator 74 is connected to the output of the multiplier 72. The real value of the ambiguity function appears on the output lead 76 of said computation circuit of order $i$ whereas it is possible to gain access to its imaginary value by means of the lead 78; a circuit 80 forms from these two values the modulus of the ambiguity functions, the value of which appears on the output lead 82.

Figure 5:
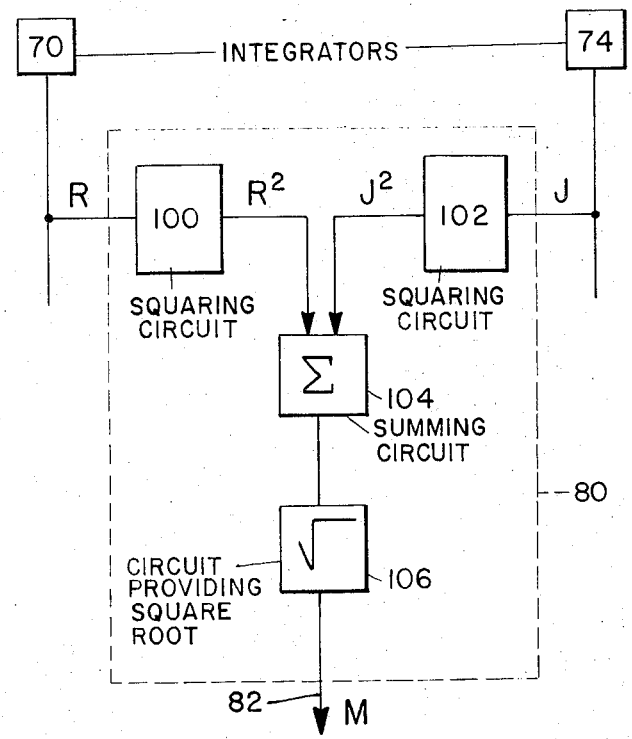
FIG. 5 is a diagram of the modules forming circuit of FIG. 4.

Circuit 80, circuit 92 being identical, as seen in FIG. 5 is found in FIG. 7 of French Pat. No. 1,452,084 and particularly circuits 140, 142 and 150 thereof and is described on page 12 of that patent. In FIG. 5 circuit 100 receives the value R representing the actual part calculated in circuit 70 and delivers a signal equal to the $R^2$. Circuit 102 is identical to circuit 100 and receives the imaginary part J and delivers a signal equal to $J^2$. Circuit 104 is connected to circuits 100 and 102 and sums the values of $R^2$ and $J^2$. Circuit 106 is connected to circuit 104 and provides the square root of the sum of the squares $R^2$ and $J^2$ and gives the modules m at output 82.

This circuit is reproduced without modification for the process relating to another value $f_j$ of frequency of the signals emitted by the generator 48; the circuit of order $j$ again comprises a multiplier 84 and an integrator 86 in the cosine chain as well as another multiplier 88 and another integrator 90 in the sine chain; the circuit 92 computes th modulus of the ambiguity function which appears on the lead 94 whereas the real and imaginary portions appear respectively on the leads 96 and 98.

In a first alternative embodiment, the generator 48 is an analog generator which emits sinusoidal signals and the frequency $f = s\phi$ of said signals can assume R values when $s$ assumes all the whole values comprised between 1 and R. It is in that case particularly convenient to employ a multiplier of the type providing double modulation of amplitude and width as described, for example, in French Pat. No. 1 493 450 applied-for on Apr. 25th, 1966 corresponding to U.S. Pat. No. 3,555,258, issued Jan. 12, 1971.

In this arrangement, the coded signals which appear on the leads 44 produce pulse-width modulation whereas the analog signals which appear on the leads 60 and/or 64 produce amplitude modulation of the pulse which have already been modulated in width. The integrator 70 (and/or 74) determines the mean value of areas of doubly modulated pulses. Reference can be made to the aforementioned patent for constructional details of the multiplier 68 (or 72) and of the integrators 70 and 74.

In a second alternative embodiment of the device, it is particularly convenient to employ as function generator 48 a generator which delivers on $N$ pairs of outputs numbered from $K = 1$ to $K = N$ samples of the form cos $\pi/T$ $Kp\theta$ and/or sin $\pi/T$ $Kp\theta$ in respect of the $N$ values of the integer K which increase from 1 inclusive to $T/\theta$ inclusive. In this case, sampling of the cosine and sine functions must be in synchronism with the sampling of the polarity signals extracted from the sign detectors 22 and 36 of FIG. 3. This can be performed by means of the clock 26 which also initiates the sampling process within the generator 48.

In this alternative embodiment, simultaneous sampling of the product of the signs of the functions $Z_1$ and $Z_2$ and of the cosine and sine functions makes it possible to produce a Fourier transformer as disclosed in French Pat. No. 1,585,451. It is in fact known that, if the function whose Fourier transform is to be computed is known in sampled form at a certain number of uniformly spaced points of $\theta$ - which is the case with the signals sgn $Z_1(p\theta) \times$ sgn $Z_2(p\theta - q\theta)$ which appear on the leads 44 - it is convenient to obtain in respect of each value of $q$ the products of said samples and of the corresponding samples cos $\theta/T$ $Kp\theta$ (and if necessary the products of the same samples and sin $\pi/T$ $Kp\theta$) in the case of all values of $p$ and to form the sum of these successive products; each of these sums represents one sampling point relative to the frequency $f = K/$ $2T$ and to the time-delay $r = q\theta$.

In this alternative embodiment, a stage 50 of order $q$ is constituted by N circuits of order K. The multipliers of the N circuits of any one stage of order $q$ are all connected in parallel to the exclusive-OR gate 42 of order $q$; the N multipliers of the circuits having the same order K which belong to the different N stages are all connected in parallel to the output of order K of the function generator 48. The multiplier of the circuit of order K which belongs to a stage of order $q$ delivers to its associated integrator the series of samples of the form [sgn $Z_2(p\theta - q\theta)$ $\cdot$ sgn $Z_1(p\theta)$] $\cdot$ cos $\pi/T$ $Kp\theta$ (and-/or sine), in respect of all the successive values of $p$. The integrator forms the sum of these terms, $q$ and $K$ being fixed and $p$ being variable from $-T/\theta$ to $+T/\theta$, which gives a sample of the ambiguity function in relation to the frequency $f = K/2T$ and to the time-delay $r = q\theta$, whether the multiplication factor $A_1$ $A_2/2T$ is taken into account or not.

In this alternative embodiment and in accordance with the patent application cited in the foregoing, it is known that a particularly convenient method of obtaining the sampled function cos $\pi/T$ $Kp\theta$ consists in sampling a single function cos $2\pi t/T$ at points of the interval $2T$ which are spaced at an interval $\theta$ and in collecting one out of $K$ of these sampled values. In this case, the generator 48 therefore comprises only one function generator cos $2\pi t/T$ (and if necessary a generator for the function sin $2\pi t/T$) and means for sampling and suitably reading this function.

In accordance with this alternative form of construction, it is possible in some cases to make provision within the function generator 48 for means whereby the samples of the cosine or sine functions can be represented by a digital code with $p$ bits; accordingly, the multipliers 68, 72, 84, 88 and so forth are digital multipliers. In this case, they have two inputs, one of which provides for $p$ bits and receives the signals derived from the function generator 48 whilst the other input provides for a single bit and receives the previously coded signals which appear on the leads 44; in this arrangement, the integrator is also of the digital type as well as the different outputs 76, 78 and 82 on which the result of computation of the ambiguity function appears. Should it be desired to put the result in an analog form, there will accordingly be associated with the above-mentioned digital device a digital-to-analog converter having a number of binary positions at inputs corresponding to the number of bits of signals which appear on the binary output leads of the device.

For a precise description of this type of apparatus, reference can also be made to French Pat. No. 2,088,191 corresponding to U.S. Pat. No. 3,745,317.

It is therefore apparent from the foregoing description that the formulation of the approximate value of the ambiguity function in accordance with the invention utilizes polarity signals whose product can very readily be computed, thereby permitting the design and development of a device which is wholly suited to the analog or digital techniques already employed in connection with Fourier transformers or correlators. The ambiguity meter which is thus provided by the invention accordingly has the same properties as these different units, namely the possibility of processing the signals in real time, simplicity of construction and the possibility of processing the signals within a wide band. The ambiguity meter has an advantage over these units in that it computes a more general function, thereby permitting a broader analysis of the signals to be studied.

It has been assumed throughout the foregoing description that one and the same function $X(t)$ is applied to the two inputs 14 and 16 of the device; the function thus computed can be designated as an autoambiguity function by analogy with the autocorrelation function. It is wholly apparent that the method and the device according to the invention also permit the computation of a function which may be designated as an interambiguity function of two input signals $X(t)$ and $Y(t)$ which are applied respectively to the inputs 14 and 16.

What we claim is:

1. A device for estimating the value of the ambiguity function of two real functions $x(t)$ and $Y(t)$ comprising
    two inputs to which the electrical signals $X(t)$ and $Y(t)$ are applied respectively,
    two generators for producing independent random signals $B_1(t)$ and $B_2(t)$,
    a clock which emits pulses at the sampling frequency $1/\theta$,
    a first channel comprising: a mixer for receiving the signals $Y(t)$ and $B_2(t)$, a detector for detecting the sign of the output of the mixer and supplying a polarity signal applied to the input of an AND-type logical gate which also receives said clock pulses and delivers the samples sgn $Z_2(p\theta)$, a shift register having N cells and connected to said gate, a shift of said register being initiated by said clock pulses,
    a second channel comprising a mixer which receives the signals $X(t)$ and $B_1(t)$, a detector for detecting the sign of the output of the mixer and supplying a polarity signal applied to the input of an AND-type logical gate which receives said clock pulses and delivers the samples sgn $Z_1(p\theta)$,
    N exclusive-OR gates in parallel, one of the inputs of which is connected to said gate of the second channel and the other input of which is connected in the case of the gate having the order $q$ to the cell having the order $q$ of said shift register of the first channel,
    means for forming in parallel the Fourier transform of the N signals which appear at the output of each of the N exclusive-OR gates.

2. A device according to claim 1, wherein said means for forming the Fourier transform comprise:
    a sample generator having N outputs in parallel and numbered from $K = 1$ to $K = N$, the output having the order K being intended to deliver samples cos $\pi/T\, Kp\theta$ or sin $\pi/T\, Kp\theta$, said generator being controlled by said clock,
    N identical stages, the order of one stage being given the notation $q$, each stage being constituted by N circuits, the order of one circuit being given the notation K, each circuit being provided with a multiplier whose output is connected to an integrator, the multipliers of the N circuits of any one stage having the order $q$ being all connected to the exclusive-OR gate having the order $q$, the $N$ multipliers having the same order $K$ and belonging to the $N$ stages being all connected to the output having the order $K$ of said sample generator, a mulitplier of a circuit having the order K of the stage having the order $q$ being intended to deliver successively to the integrator, when $p$ varies from $-T/\theta$ to $+T/\theta$, products of the form $$[sgn\ Z_2(p\theta - q\theta) \cdot sgn\ Z_1(p\theta)]\ cos\ \pi/T\ Kp\theta\ (\text{and/or sine}),$$

the sum of said products being delivered at the output of said integrator and each final sum representing a sample of the ambiguity function in relation to the frequency $f = K/2T$ and to the time-delay $r = q\theta$.

* * * * *